(12) United States Patent
Lee

(10) Patent No.: US 8,762,045 B2
(45) Date of Patent: Jun. 24, 2014

(54) METHOD FOR ADJUSTING NAVIGATION FRAME, NAVIGATION APPARATUS AND RECORDING MEDIUM

(75) Inventor: Yu-Cheng Lee, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 442 days.

(21) Appl. No.: 12/838,497

(22) Filed: Jul. 19, 2010

(65) Prior Publication Data

US 2011/0022311 A1    Jan. 27, 2011

Related U.S. Application Data

(60) Provisional application No. 61/228,957, filed on Jul. 27, 2009.

(30) Foreign Application Priority Data

Dec. 28, 2009   (TW) .............................. 98145394 A

(51) Int. Cl.
    *G01C 21/00*    (2006.01)
    *G08G 1/123*    (2006.01)

(52) U.S. Cl.
    USPC ..................................... 701/408; 340/995.14

(58) Field of Classification Search
    USPC ......................... 701/400–541; 340/988–996; 304/988–996
    See application file for complete search history.

(56) References Cited

U.S. PATENT DOCUMENTS

| | | | |
|---|---|---|---|
| 6,282,490 B1 | 8/2001 | Nimura et al. | |
| 2003/0216861 A1* | 11/2003 | Sakata | 701/211 |
| 2004/0236507 A1* | 11/2004 | Maruyama et al. | 701/208 |
| 2006/0103646 A1* | 5/2006 | Takahashi | 345/421 |
| 2006/0277491 A1* | 12/2006 | Kaneko | 715/788 |
| 2007/0106948 A1* | 5/2007 | Ala-Rantala | 715/752 |
| 2009/0171581 A1* | 7/2009 | Ushida et al. | 701/211 |
| 2010/0317486 A1* | 12/2010 | Hyodo et al. | 477/52 |

FOREIGN PATENT DOCUMENTS

| | | |
|---|---|---|
| CN | 1349202 A | 5/2002 |
| CN | 1460836 A | 12/2003 |
| CN | 101009089 A | 8/2007 |
| CN | 101029832 A | 9/2007 |
| EP | 1696301 | 8/2006 |
| JP | 11-51666 | 2/1999 |
| JP | 2003166836 | 6/2003 |
| JP | 2006-39953 | 2/2006 |
| JP | 2007-286158 | 11/2007 |
| WO | 2008-096859 | 8/2008 |

OTHER PUBLICATIONS

"Second Office Action of Europe counterpart application" issued on Apr. 30, 2012, p. 1-p. 5.

(Continued)

*Primary Examiner* — Muhammad Shafi
(74) *Attorney, Agent, or Firm* — Jianq Chyun IP Office

(57) ABSTRACT

A method for adjusting a navigation frame, a navigation apparatus, and a recording medium are provided. In the method, a navigation frame is displayed on a screen of a device in a form of a three-dimensional picture. When an event is received, the angle of view of the navigation frame is adjusted to make the size of the navigation frame reduce and a window corresponding to the event is displayed in an area of the screen that is emptied due to the reduction of the navigation frame.

11 Claims, 9 Drawing Sheets

(56) References Cited

OTHER PUBLICATIONS

"First Office Action of China Counterpart Application", issued on Aug. 31, 2011, p. 1-p. 6.

"Office Action of Taiwan Counterpart Application", issued on Jan. 11, 2013, p. 1-p. 8.

"First Office Action of Europe Counterpart Application", issued on Nov. 5, 2010, p. 1-p. 7, and "European Search Report", issued on Oct. 26, 2010, p. 1-p. 3.

* cited by examiner

METHOD FOR ADJUSTING NAVIGATION FRAME, NAVIGATION APPARATUS AND RECORDING MEDIUM

CROSS-REFERENCE TO RELATED APPLICATION

This application claims the priority benefit of U.S. provisional application Ser. No. 61/228,957, filed on Jul. 27, 2009. This application also claims the priority benefits of Taiwan application serial no. 98145394, filed on Dec. 28, 2009. The entirety of each of the above-mentioned patent applications is hereby incorporated by reference herein and made a part of this specification.

BACKGROUND

Generally, navigation software has the function to plan a route and provide a guidance, so as to help the user to find a best route and arrive at a destination quickly and safely. However, if the end point is far away from the start point, then the planed route may cover a relatively large map area. In order to clearly show details of the map and the navigation route that can be recognized by the user, the navigation software adaptively adjusts the scaling ratio and range of the map and only displays the map and the navigation route nearby the navigation device. Furthermore, the map is displayed in a full-screen mode so that the user can clearly recognize the navigation route at a glance.

When the navigation software displays the map in the full-screen mode, the mobile device may receive an incoming call, a short message, an instant message, or an email from outside. At this time, the mobile device usually temporarily stops the navigation function or closes the navigation frame, and then calls a corresponding operating window, such that the user may make a response to the received event. However, the action of stopping the navigation function or closing the navigation frame probably influences a determination of a user for a driving path or makes a user miss the corner to make a turn, and accordingly jeopardizes a safety of driving.

SUMMARY

The present application is directed to a method for adjusting a navigation frame, which adjusts the angle of view of the navigation frame and provides users with ease to respond to the received event.

The present application is also directed to a navigation apparatus, which displays a window corresponding to the received event without affecting the navigation function.

The present application provides a method for adjusting a navigation frame, suitable for a mobile device having a screen. In the method, a navigation frame is displayed on the screen in a form of a three-dimensional picture. When an event is received, the angle of view of the navigation frame is adjusted to make the size of the navigation frame reduce and a window corresponding to the event is displayed in an area of the screen that is emptied due to the reduction of the navigation frame.

In one example of the application, the aforesaid window comprises an operation window or a browsing window.

In one example of the application, the step of adjusting the angle of view of the navigation frame to make the size of the navigation frame reduce comprises maintaining a range of a map displayed in the navigation frame when reducing the size of the navigation frame.

In one example of the application, the step of displaying the navigation frame on the screen in the form of a three-dimensional picture comprises displaying the navigation frame in a form of a bird eye view, wherein a plurality of objects of the navigation frame are displayed on a plane of the bird eye view.

In one example of the application, the step of displaying the navigation frame on the screen in the form of a three-dimensional picture comprises displaying the navigation frame in a form of a curve map, wherein a plurality of objects of the navigation frame are displayed on a curved plane of the curve map.

In one example of the application, before receiving the event, the method further comprises detecting a tilting angle of the mobile device, determining whether the detected tilting angle is within a predetermined range, and triggering the event when the detected tilting angle is within the predetermined range.

In one example of the present application, the step of receiving the event comprising receiving an incoming call, a short message, an instant message, or an e-mail.

In one example of the present application, the step of displaying the window corresponding to the event comprises displaying an operating window for answering the incoming call when receiving an incoming call.

In one example of the present application, the step of receiving the event comprises receiving an operation of a user, so as to trigger the event.

In one example of the application, the step of adjusting the angle of view of the navigation frame to make the size of the navigation frame reduce comprises displaying the reduced navigation frame on an upper area of the screen to empty a lower area of the screen for displaying the window.

In one example of the application, the step of displaying the window corresponding to the event in the area of the screen that is emptied due to the reduction of the navigation frame comprises displaying a content of the event or displaying at least one function key or a menu corresponding to the event.

In one example of the present application, after the step of displaying the window corresponding to the event, the method further comprises receiving an operation of a user for the window to execute a corresponding function.

In one example of the present application, after the step of displaying the window corresponding to the event, the method further comprises closing the window and adjusting the angle of view of the navigation frame back to the original angle of view so as to resume the size of the navigation frame when the event is ended.

The present application provides a navigation apparatus, which comprising a positioning unit, a display unit, an input unit, and a processing unit. The positioning unit is used for obtaining a current location of the navigation device. The display unit is used for displaying a navigation frame. The input unit is used for receiving an operation of a user. The processing unit is coupled to the positioning unit, the input unit, and the display unit, and is for displaying a navigation frame on the screen in a form of a three-dimensional picture. When receiving an event, the processing unit is used for adjusting the angle of view of the navigation frame to reduce the size of the navigation frame and displaying a window corresponding to the event in an area of the screen that is emptied due to the reduction of the navigation frame.

The present application further provides a recording medium which records a computer program to be loaded into a mobile device to execute following steps. First, a navigation frame is displayed on the screen in a form of a three-dimensional picture. When an event is received, the angle of view of the navigation frame is adjusted to make the size of the navigation frame reduce and a window corresponding to the event is displayed in an area of the screen that is emptied due to the reduction of the navigation frame.

Based on the above, the method for adjusting the navigation frame, the navigation apparatus and the recording medium of the application adaptively adjust the angle of view of the navigation frame when receiving an external event or an event triggered by a user, so as to empty an area of the screen for displaying a corresponding operation or browsing window. Accordingly, the application provides users with ease to respond to the event without affecting the navigation function.

In order to make the aforementioned and other features and advantages of the application more comprehensible, examples accompanying figures are described in detail below.

BRIEF DESCRIPTION OF THE DRAWINGS

The accompanying drawings are included to provide a further understanding of the application, and are incorporated in and constitute a part of this specification. The drawings illustrate examples of the application and, together with the description, serve to explain the principles of the application.

DESCRIPTION OF EXAMPLES

The present application adaptively adjusts the angle of view of a navigation frame corresponding to a received event when a mobile apparatus displays the navigation frame in a form of a three-dimensional picture, so as to empty a screen space for displaying a window corresponding to the event. Accordingly, the application may provide users with ease to respond to an external event or perform an operation on a self-triggered event.

Figure 1:
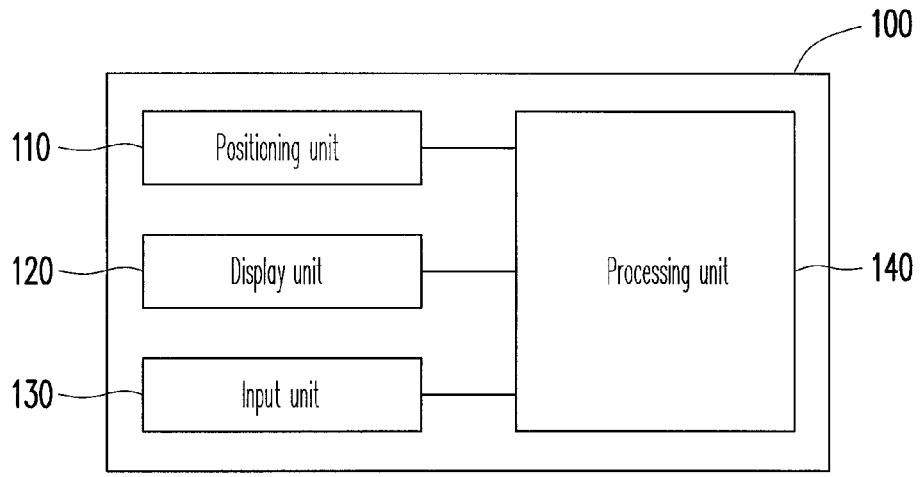
FIG. 1 is a block diagram of a navigation apparatus according to an example of the present application.

FIG. 1 is a block diagram of a navigation apparatus according to an example of the present application. Referring to FIG. 1, the navigation apparatus 100 comprises a positioning unit 110, a display unit 120, an input unit 130, and a processing unit 140, and may provide users with ease to respond to the triggered event in the process of executing a navigation function. The navigation apparatus 100 is, for example, a mobile phone, a smartphone, a personal digital assistance (PDA), a PDA phone or a Car PC, which is not limited thereto. The functions of aforesaid elements are respectively illustrated in the following.

The positioning unit 110 is used for obtaining a current location of the navigation apparatus 100, and is, for example, a global positioning system (GPS), or other positioning systems using a global system for mobile communication (GSM) system, a personal handy-phone system (PHS), a code division multiple access (CDMA) system, a wireless fidelity (Wi-Fi) system, a worldwide interoperability for microwave access (WiMAX) system, a radio repeater, or a radio broadcaster for positioning, which is not limited by the present example.

The display unit 120 is, for example, a liquid crystal display (LCD), a light emitting diode (LED) display, an organic light emitting diode (OLED) display, or other displays suitable for displaying the navigation frame.

The input unit 130 is, for example, a mouse, a keyboard, or a touch pad used for receiving an operation of a user for planning a navigation route. Wherein, the input unit 130 may also be, for example, a resistive type, a capacitive type, or other types of touch sensitive units may be integrated with the display unit 120 to form a touch screen.

The processing unit 140 is, for example, a central processing unit (CPU), or other programmable ordinary used or specifically used microprocessor, digital signal processor (DSP), programmable controller, application specific integrated circuits (ASIC), programmable logic device (PLD), or other similar devices or a combination of those devices.

The processing unit 140 is coupled to the positioning unit 110, the display unit 120, and the input unit 130, and may adjust the angle of view of a navigation frame displayed by the display unit 120 according to a received event. Examples are given below for illustrating detailed steps of the navigation apparatus 100 adjusting the navigation frame.

Figure 2:
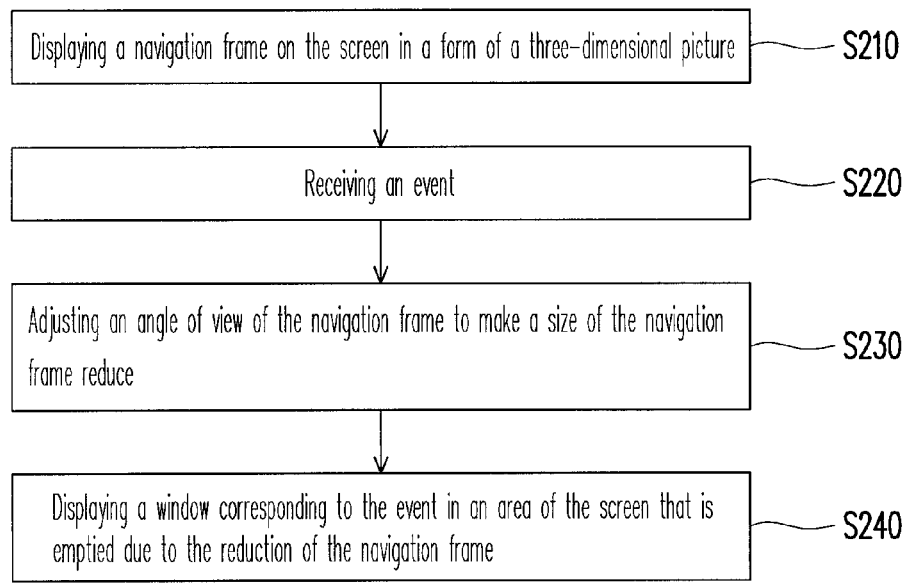
FIG. 2 is a flowchart illustrating a method for adjusting a navigation frame according to an example of the present application.

FIG. 2 is a flowchart illustrating a method for adjusting a navigation frame according to an example of the present application. Referring to FIG. 2, the method of the example is suitable for the navigation apparatus 100 in FIG. 1 and detailed steps of the navigation frame adjusting method of the application are described in detail below with reference to the aforesaid elements of the navigation apparatus 100.

First, the processing unit 140 of the navigation apparatus 100 displays the navigation frame on the display unit 120 in a form of a three-dimensional picture (S210). The navigation apparatus 100, for example, performs positioning to obtain a current location thereof by using the positioning unit 110, receives a destination inputted by a user by using the input unit 130, and finally sets the current location as a start point and sets the location of the destination as an end point to plan a navigation route by using the processing unit 140.

It is noted herein that when displaying the navigation frame, the processing unit 140, for example, displays the navigation frame in a form of a bird eye view and displays a plurality of objects of the navigation frame on a plane of the bird eye view. The processing unit 140 also, for example, displays the navigation frame in a form of a curve map and displays a plurality of objects of the navigation frame on a curved plane of the curve map. When displaying the objects, the processing unit 140 further scales each of the objects according to a relative distance between the location of the object and a current location of the mobile device, and displays the scaled object on the plane of the bird eye view or on the curved plane of the curve map. In brief, the objects in a close end of the screen have a larger size so as to provide details of the map and the objects for a user to inspect and the objects in a far end of the screen has a smaller size so as to provide a larger viewable map or route for a user to browse.

Figure 3:
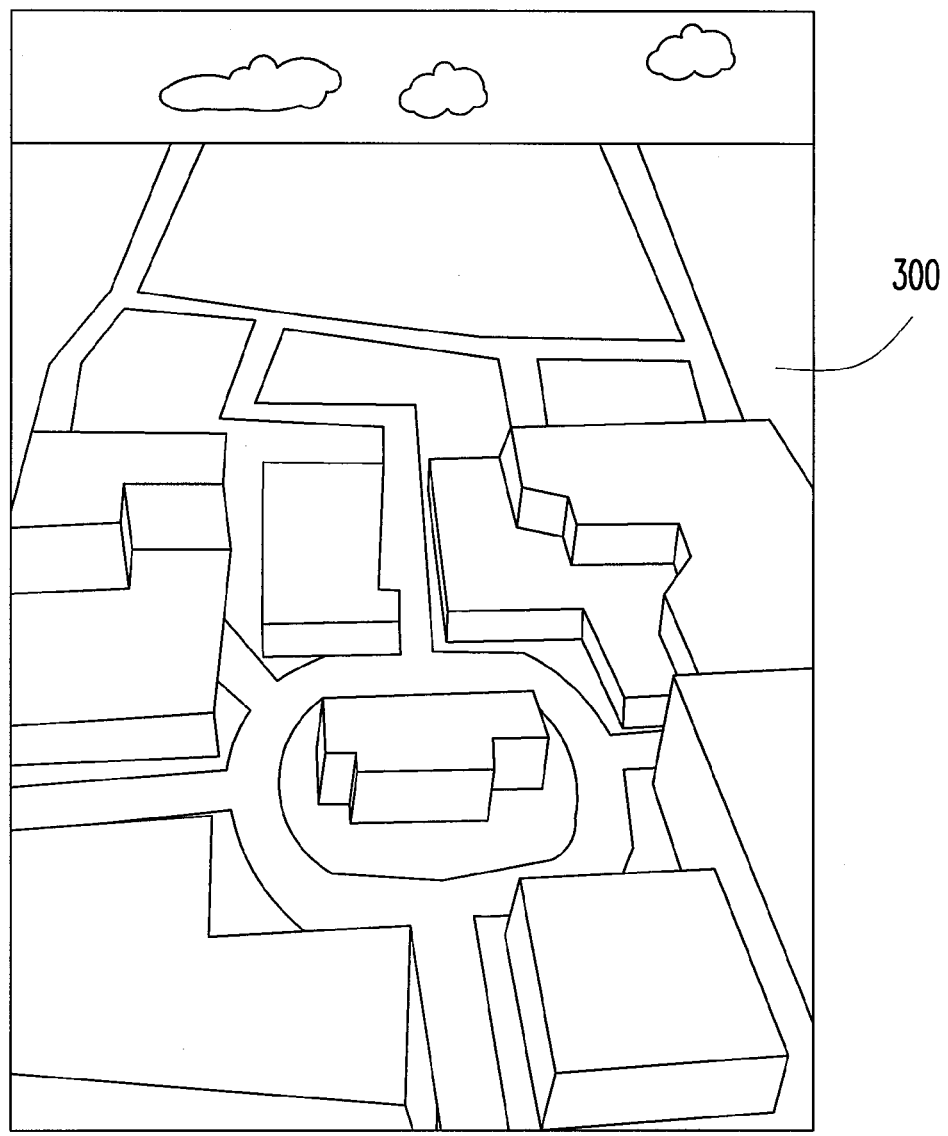
FIG. 3 is an example of a navigation frame according to an example of the application.
Figure 4:
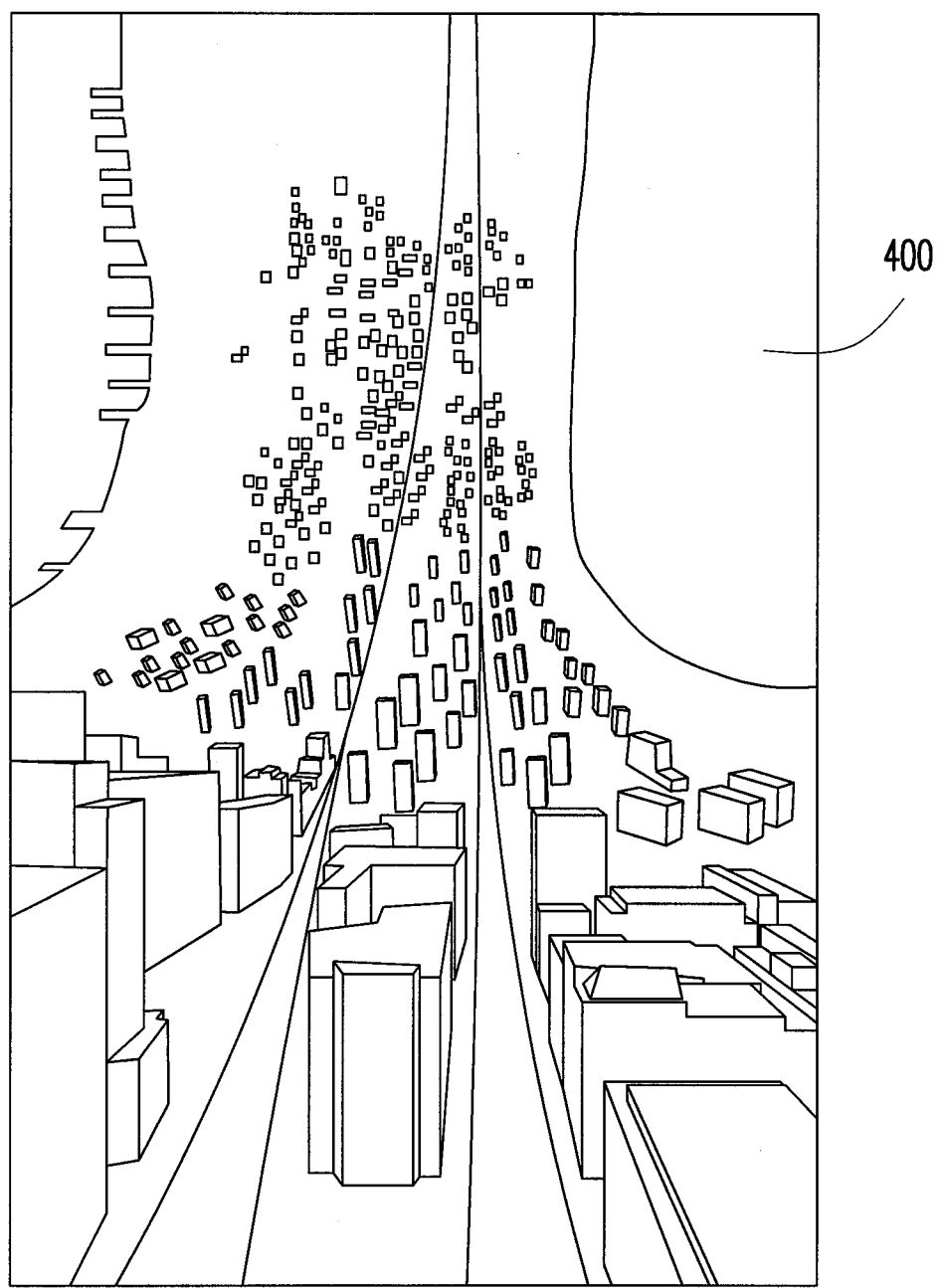
FIG. 4 is an example of a navigation frame according to an example of the application.

For example, FIG. 3 and FIG. 4 are examples of the navigation frame according to an example of the application.

Referring to FIG. 3 and FIG. 4, the navigation frame 300 is displayed in a form of a bird eye view and the navigation frame 400 is displayed in a form of a curve map. Since the navigation frames 300 and 400 are both displayed in a form of a three-dimensional picture, a tilting angle is included between a map plane of the navigation frame and a screen plane, therefore the map is displayed on the screen in a particular angle of view. In addition, the objects in a lower area of the navigation frames 300 and 400 are magnified and the objects in an upper area of the navigation frames 300 and 400 are contracted such that a user is able to experience the distances among the objects according to the sizes thereof.

Back to step S210, in the process of the display unit 120 displaying the navigation frame, when receiving an event (step S230), the processing unit 140 adjusts the angle of view of the navigation frame immediately, so as to reduce the size of the navigation frame (step S230) and empty an area of the screen. The received event comprises an external event such as an incoming call, a short message, an instant message, or an e-mail, or an internal event triggered by the user, which is not limited thereto. It should be noted herein that, in an example, the processing unit 140 still substantially maintains a range of a map displayed in the navigation frame when reducing the size of the navigation frame.

After adjusting the navigation frame, the processing unit 140 further displays a window corresponding to the event in the area of the screen that is emptied due to the reduction of the navigation frame (step S240). Accordingly, the navigation apparatus 100 may provide users with ease to respond to an external event or perform an operation for a self-triggered event.

It is noted herein that the navigation apparatus 100 of the application may correspondingly adjusts the navigation frame according to the event triggered by different manners, thus offering the user to make a response. Regarding the external event and the user-triggered event, corresponding examples are given below for further illustration.

Figure 5:
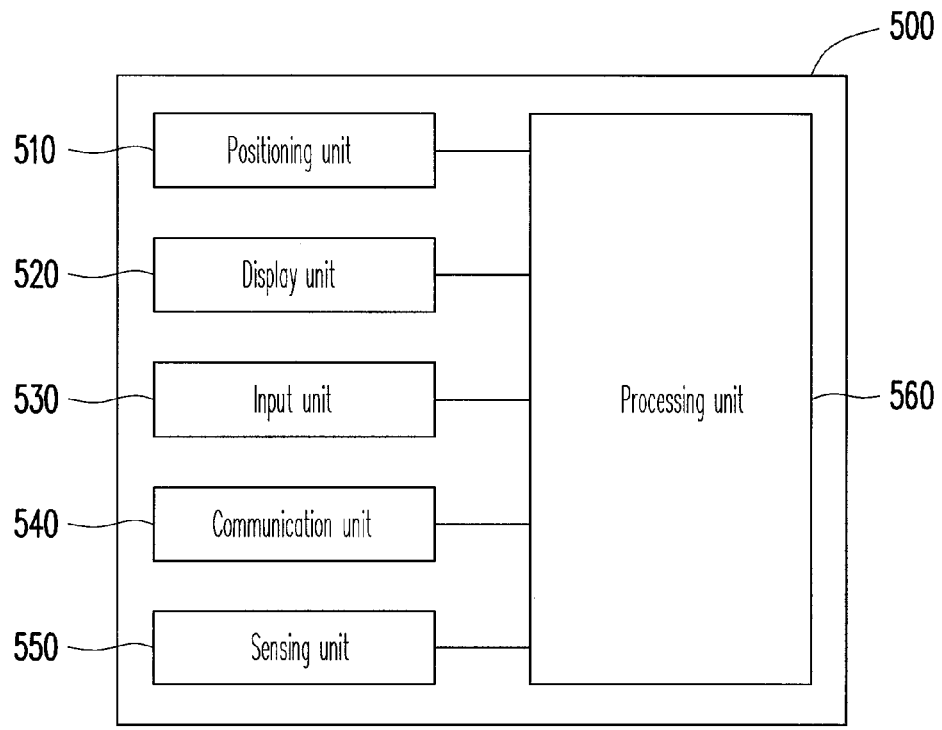
FIG. 5 is a block diagram of a navigation apparatus according to an example of the present application.

FIG. 5 is a block diagram of a navigation apparatus according to an example of the present application. Referring to FIG. 5, the navigation apparatus 500 comprises a positioning unit 510, a display unit 520, an input unit 530, a communication unit 540, a sensing unit 550, and a processing unit 560. The functions of the positioning unit 510, the display unit 520, and the input unit 530 are the same as those of the positioning unit 110, the display unit 120, and the input unit 130 in the aforesaid examples. Hence, the descriptions thereof are omitted herein.

Different from the above-described examples, the navigation apparatus 500 herein is further disposed with the communication unit 540 and the sensing unit 550. The communication unit 540 is, for example, a device for communicating through communication systems such as GPS, PHS, CDMA, Wi-Fi, or WiMAX. The communication unit 540 may receive external events such as an incoming call, a short message, an instant message, or an e-mail from an external device. The sensing unit 550 is, for example, a G sensor, which is able to detect a tilting angle of the navigation apparatus 500 and determine an operation of a user for the navigation apparatus 500 so as to trigger an internal event.

Figure 6:
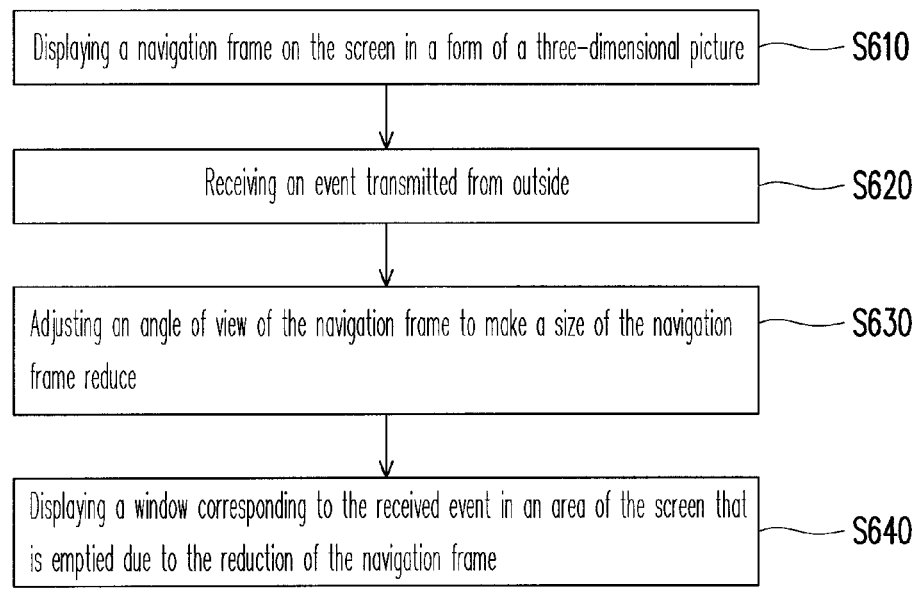
FIG. 6 shows a flowchart illustrating a method for adjusting a navigation frame according to an example of the present application.

Regarding the condition of receiving the external event, FIG. 6 shows a flowchart illustrating a method for adjusting a navigation frame according to an example of the present application. Referring to both FIG. 5 and FIG. 6, when receiving the external event, the navigation apparatus 500 automatically adjusts the angle of view and the size of the navigation frame, so as to display a window corresponding to the event and provide users with ease to make a response. The steps thereof are as follows.

First, the processing unit 560 displays the navigation frame on the display unit 520 in a form of a three-dimensional picture (S610). The navigation apparatus 500, for example, performs positioning to obtain a current location thereof by using the positioning unit 510, receives a destination inputted by a user by using the input unit 520, and finally sets the current location as a start point and sets the location of the destination as an end point to plan a navigation route by using the processing unit 560.

Next, the communication unit 540 receives an external event transmitted from outside (step S620), in which the external event is, for example, an incoming call, a short message, an instant message, or an e-mail. When receiving the external event, the communication unit 540 transmits the event to the processing unit 560 for performing subsequent processes.

When receiving the event, the processing unit 560 then adjusts the angle of view of the navigation frame to make the size of the navigation frame reduce (step S630), so as to empty an area of the screen, in which the processing unit 560 still substantially maintains a range of a map displayed in the navigation frame when reducing the size of the navigation frame.

After the navigation frame is adjusted, the processing unit 560 further displays a window corresponding to the event in the area of the screen that is emptied due to the reduction of the navigation frame (step S640). According to the type of the received event, the window may be, for example, a content of the event or at least one function key or a menu corresponding to the event displayed by the processing unit 560. For example, when receiving an incoming call, the processing unit 560 displays a window for answering the incoming call in the emptied area of the screen. In addition, the processing unit 560, for example, displays the reduced operating window in an upper area of the screen and empties a lower area of the screen for displaying the window corresponding to the received event.

Figure 7A:
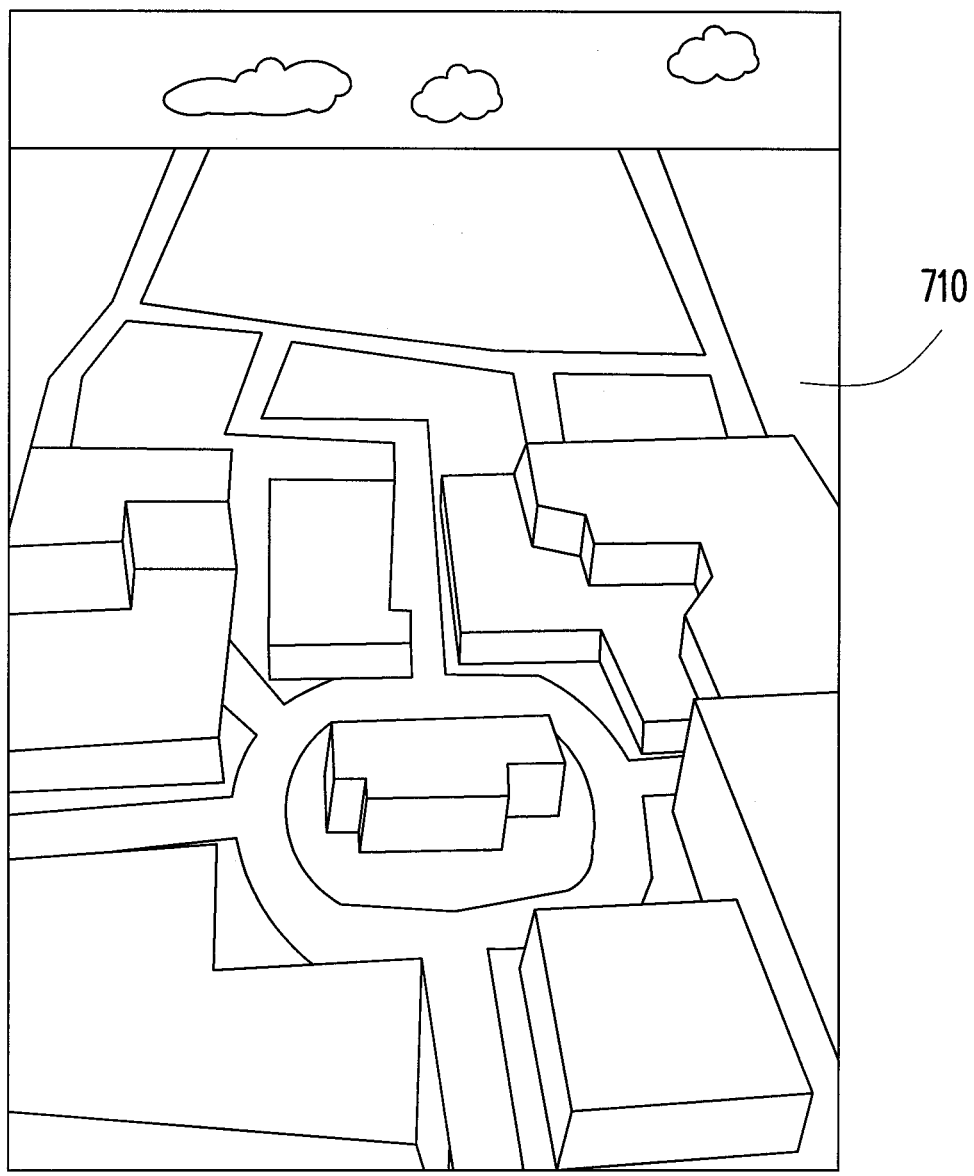
FIGS. 7A and 7B are examples of adjusting the navigation frame according to an example of the application.
Figure 7B:
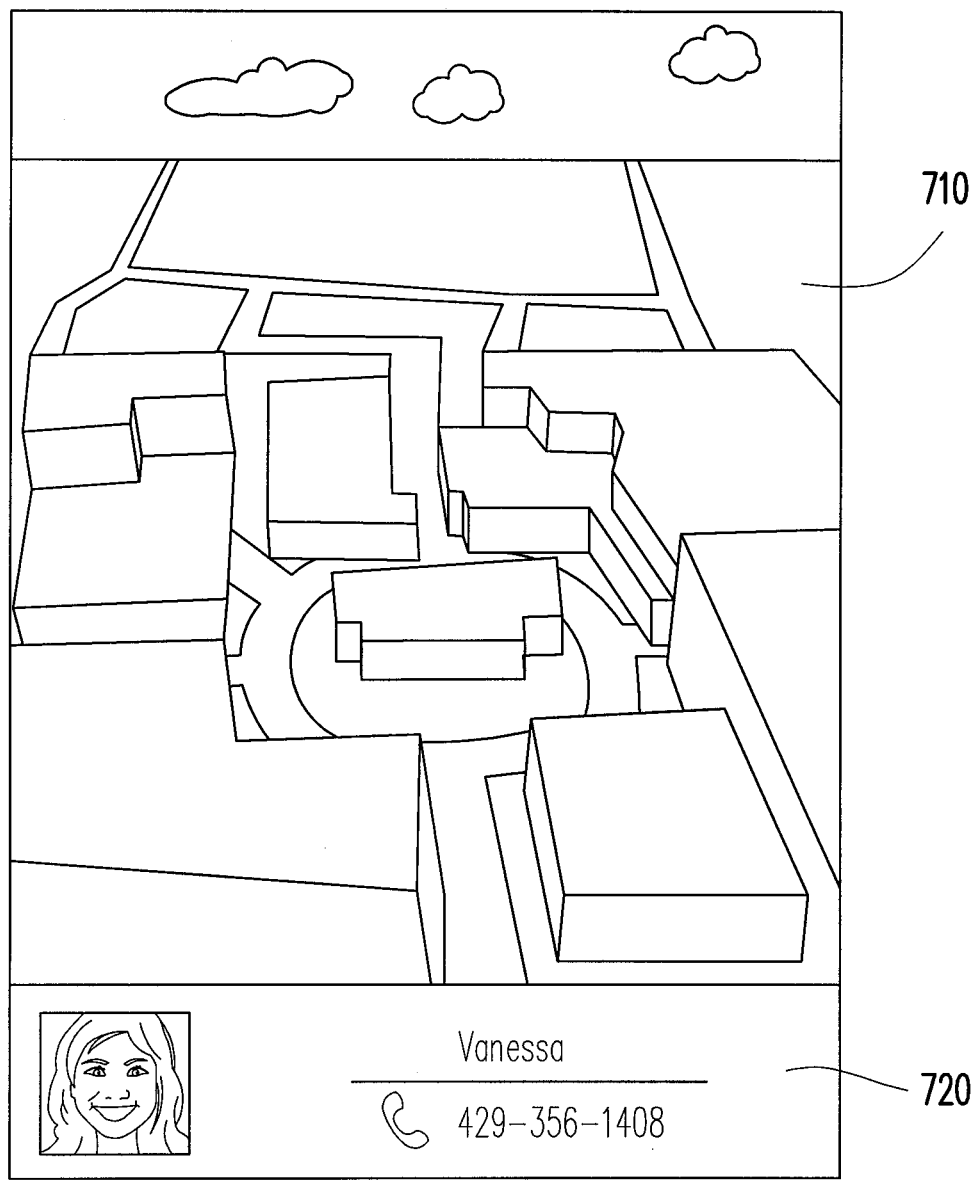

For example, FIG. 7A and FIG. 7B are examples of adjusting the navigation frame according to an example of the application. Referring to FIG. 7A first, the navigation frame 710 is displayed in a form of a bird eye view, which comprises objects from large to small displayed in the screen from near to far according to the distances between the locations of the objects and the current location of the navigation apparatus, thus offering the user to browse. Referring to FIG. 7B, the navigation apparatus adjusts the angle of view of the navigation frame 710 to reduce the size of the navigation frame 710 and displays the reduced navigation frame 710 on the upper area of the screen when receiving the incoming call. In the meantime, the navigation apparatus also displays a window 720 corresponding to the incoming call on the lower area of the screen, in which the window 720 comprises a name and a telephone number of the caller, thus offering the user to make a response (i.e. answering the call or ignoring the call).

It should be noted herein that in the meantime of displaying the adjusted navigation frame and the window, the navigation apparatus 500 still detects an operation from the user by the input unit 530, so as to execute corresponding functions such as answering or ignoring the call. In addition, the navigation apparatus 500 also closes the window and adjusts the angle of view of the navigation frame back to the original angle of view so as to resume the size of the navigation frame when the event is ended (e.g. the call is ended).

Figure 8:
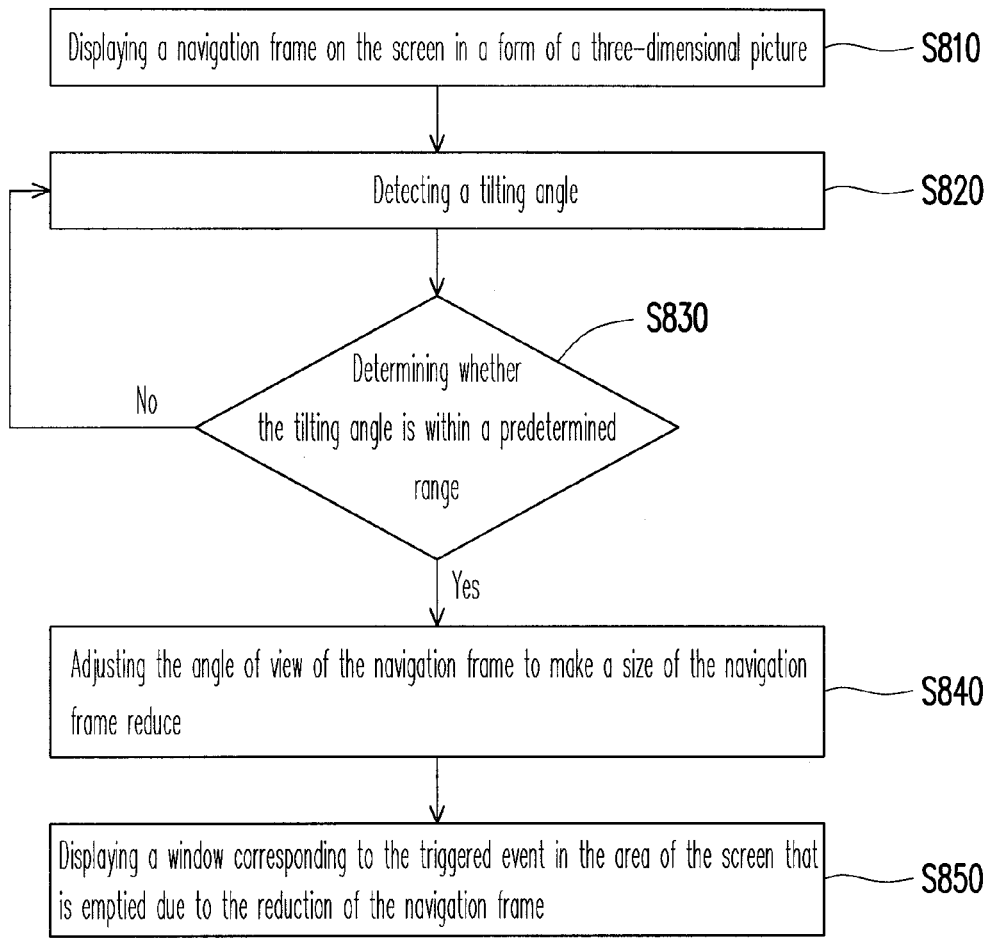
FIG. 8 shows a flowchart illustrating a method for adjusting a navigation frame according to an example of the present application.

Regarding the condition of receiving the user-triggered event, FIG. 8 shows a flowchart illustrating a method for adjusting a navigation frame according to an example of the present application. Referring to both FIG. 5 and FIG. 8, when receiving the user-triggered event, the navigation apparatus 500 automatically adjusts the angle of view and the size of the navigation frame, so as to display a window corresponding to the event and provide users with ease to make a response. The steps thereof are as follows.

First, the processing unit 560 displays the navigation frame on the display unit 520 in a form of a three-dimensional picture (S810). The navigation apparatus 500, for example, performs positioning to obtain a current location thereof by using the positioning unit 510, receives a destination inputted by a user by using the input unit 520, and finally sets the current location as a start point and sets the location of the destination as an end point to plan a navigation route by using the processing unit 560.

Next, the navigation apparatus 500 detects a tilting angle thereof by using the sensing unit 550 (step S820) and transmits the detected tilting angle to the processing unit 560. The processing unit 560 then determines whether the tilting angle is within a predetermined range (step S830), which is, for example, from 15 to 20 degree. If the processing unit 560 determines that the tilting angle is not within the predetermined range, then the process returns to step S620 for continuing detecting the tilting angle. If the processing unit 560 determines that the tilting angle is within the predetermined range, then an event is triggered and the processing unit 560 adjusts the angle of view of the navigation frame to make the size of the navigation frame reduce (step S840), so as to empty an area of the screen, in which the processing unit 560 still substantially maintains a range of a map displayed in the navigation frame when reducing the size of the navigation frame.

After the navigation frame is adjusted, the processing unit 560 further displays a window corresponding to the triggered event in the area of the screen that is emptied due to the reduction of the navigation frame (step S850). The window may be, for example, function keys or a menu corresponding to the user-triggered event displayed by the processing unit 560 according to the detection of the sensing unit 550. For example, when the user-triggered event is making a call, the processing unit 560 displays a dialing button or a contact list in the emptied area of the screen, offering the user to operate.

Figure 9A:
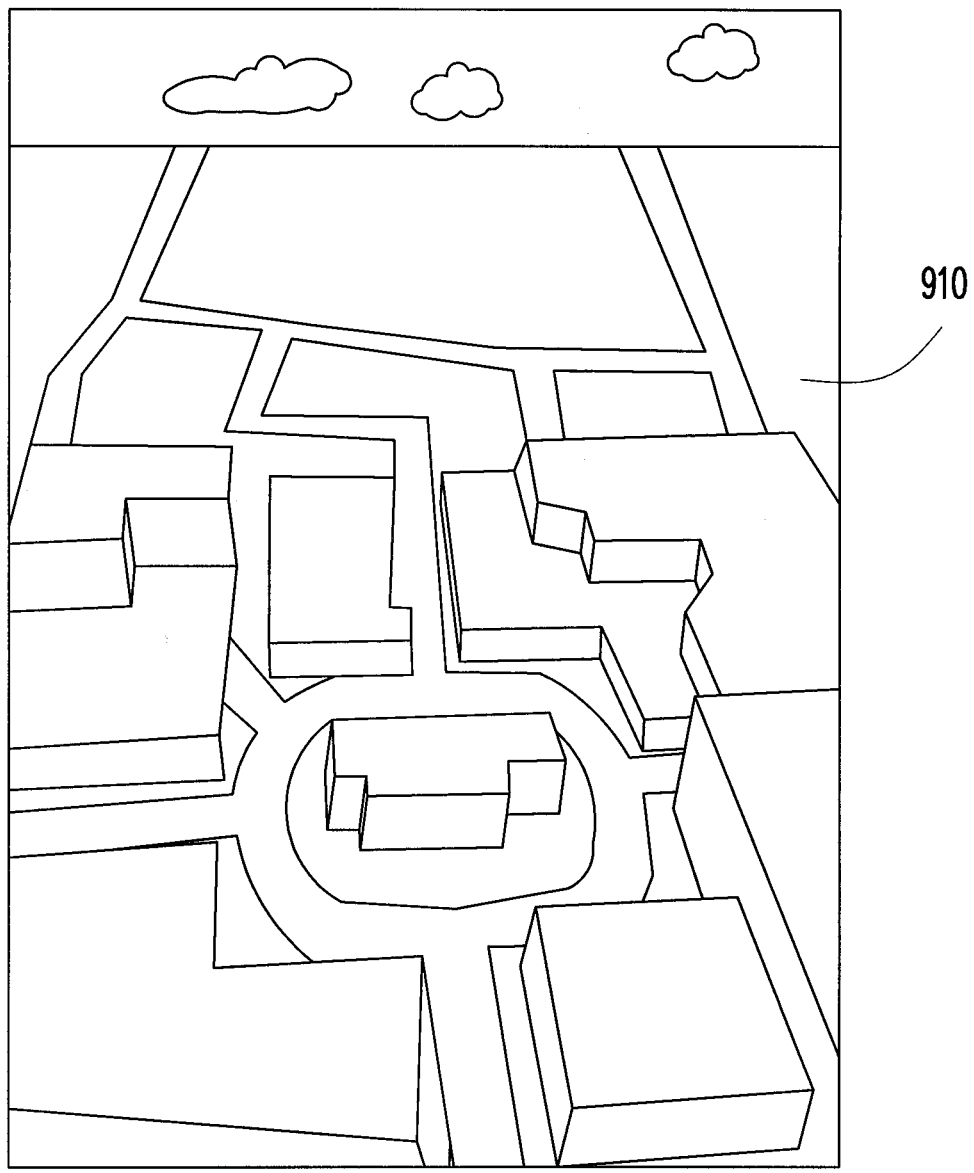
FIGS. 9A and 9B are examples of adjusting the navigation frame according to an example of the application.
Figure 9B:
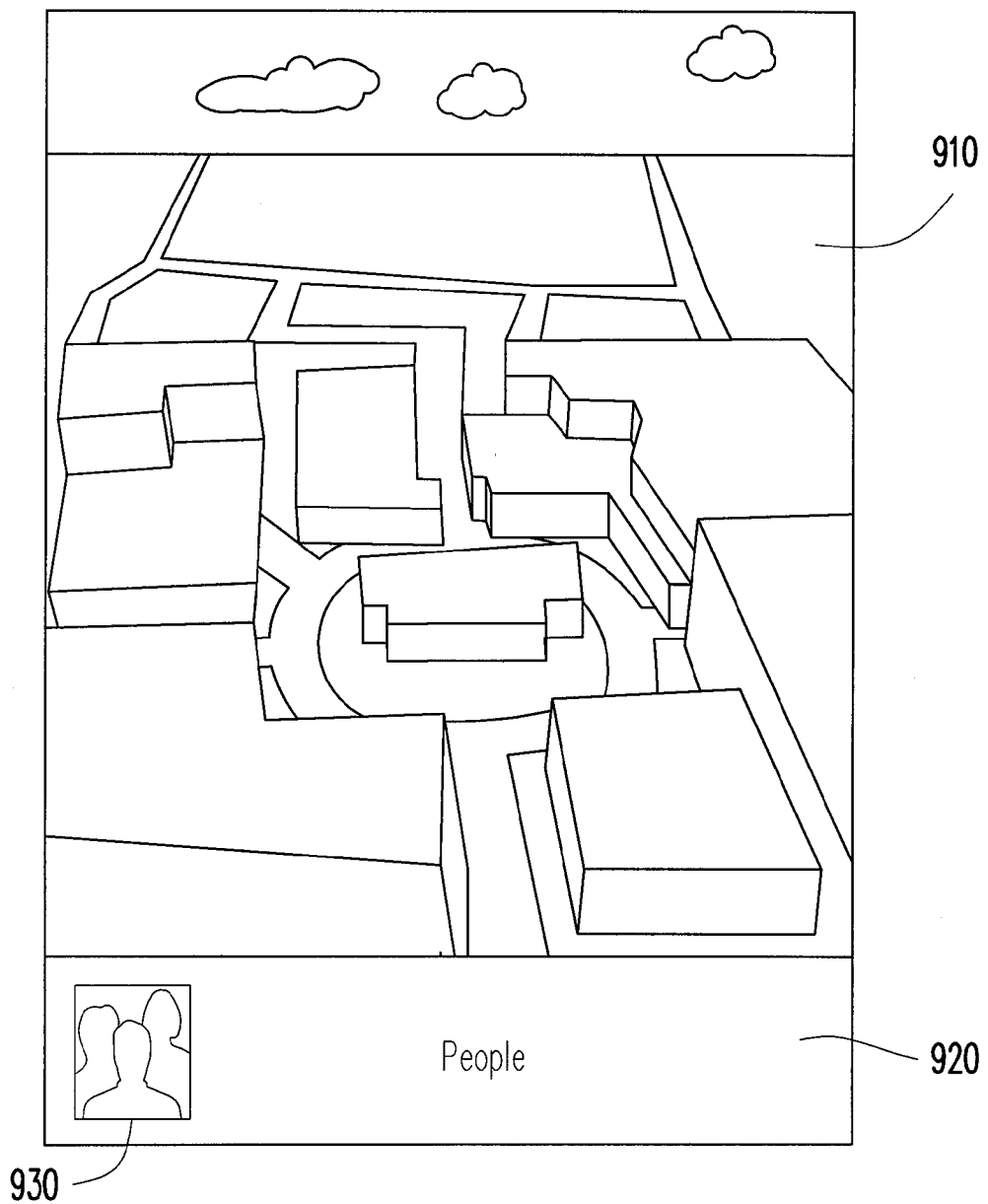

For example, FIG. 9A and FIG. 9B are examples of adjusting the navigation frame according to an example of the application. Referring to FIG. 9A first, the navigation frame 910 is displayed in a form of a bird eye view, which comprises objects from large to small displayed in the screen from near to far according to the distances between the locations of the objects and the current location of the navigation apparatus, thus offering the user to browse. Referring to FIG. 9B, the navigation apparatus adjusts the angle of view of the navigation frame 910 to reduce the size of the navigation frame 910 and displays the reduced navigation frame 910 on the upper area of the screen when determining that the user triggers the event. In the meantime, the navigation apparatus also displays a corresponding operating window 920 on the lower area of the screen, in which the window 920 comprises a function key of a phone book, thus offering the user to activate a phone book and make a call therethrough.

It should be noted herein that in the meantime of displaying the adjusted navigation frame and the window, the navigation apparatus 500 still continues to receive an operation from the user by the input unit 530, so as to execute corresponding functions such as making a call. In addition, the navigation apparatus 500 also closes the window and adjusts the angle of view of the navigation frame back to the original angle of view so as to resume the size of the navigation frame when the event is ended (e.g. the call is ended).

The present application further provides a recording medium which records a computer program to be loaded into a mobile device to execute the method for adjusting the navigation frame described above. The computer program product is composed of a plurality of program instructions (for example, an organization chart establishing program instruction, a table approving program instruction, a setting program instruction, and a deployment program instruction, etc), and these program instructions are loaded into the mobile device and executed by the same to accomplish various steps in the method for adjusting the navigation frame and various functions of the navigation apparatus described above.

Based on the above, the method for adjusting a navigation frame, the navigation apparatus, and the recording medium of the application detect an event transmitted externally or an event triggered by a user when displaying a navigation frame, so as to adjust the angle of view of the navigation frame to make the size thereof reduce and display a window corresponding to the event. Therefore, the application may provide users with ease to operate the navigation apparatus without affecting the navigation function.

Although the application has been described with reference to the above examples, it will be apparent to one of the ordinary skill in the art that modifications to the described example may be made without departing from the spirit of the application. Accordingly, the scope of the application will be defined by the attached claims not by the above detailed descriptions.

What is claimed is:

1. A navigation apparatus, comprising:
    a positioning unit, configured to obtain a current location of the navigation device;
    a display unit, configured to display a navigation frame;
    an input unit, configured to receive an operation of a user;
    a processing unit, coupled to the positioning unit, the display unit and the input unit, and configured to display a navigation frame on the display unit in a form of a three-dimensional picture, to adjust the angle of view of the navigation frame to make the size of the navigation frame reduce, and to display a window corresponding to an event in an area of the display unit that is emptied due to the reduction of the navigation frame when receiving the event; and
    a sensing unit, coupled to the processing unit, and configured to detect a tilting angle of the navigation apparatus and transmitting the detected tilting angle to the processing unit,
    wherein the detected tilting angle is an angle of tilt of the navigation apparatus detected by the sensing unit, and the processing unit triggers the event of adjusting the angle of view of the navigation frame when the detected tilting angle is being compared to a predetermined range and determined to be within the predetermined range.

2. The navigation apparatus according to claim 1, wherein the window comprises an operation window or a browsing window.

3. The navigation apparatus according to claim 1, wherein the processing unit is further configured to maintain a range of a map displayed in the navigation frame when reducing the size of the navigation frame.

4. The navigation apparatus according to claim 1, wherein the processing unit is further configured to display the navigation frame in a form of a bird eye view, wherein a plurality of objects of the navigation frame are displayed on a plane of the bird eye view; and the processing unit further comprises scaling each of the objects and displaying the scaled object on the plane of the bird eye view according to a relative distance between a map location of the object and a current location of the mobile device.

5. The navigation apparatus according to claim 1, wherein the processing unit is further configured to display the navigation frame in a form of a curve map, wherein a plurality of objects of the navigation frame are displayed on a curved plane of the curve map; and wherein the processing unit further comprises scaling each of the objects and displaying the scaled object on the curved plane of the curve map according to a relative distance between a map location of the object and a current location of the mobile device.

6. The navigation apparatus according to claim 1, further comprising:
a communication unit, coupled to the processing unit, and is configured to receive an incoming call, a short message, an instant message, or an e-mail so as to trigger the event and transmit the event to the processing unit.

7. The navigation apparatus according to claim 1, wherein the input unit is further configured to receive an operation of a user, so as to trigger the event.

8. The navigation apparatus according to claim 1, wherein the processing unit is further configured to display a content of the event or displaying at least one function key or a menu corresponding to the event.

9. The navigation apparatus according to claim 1, wherein the input unit is further configured to receive an operation of a user for the window and transmitting the operation to the processing unit for executing a corresponding function.

10. The navigation apparatus according to claim 1, wherein the processing unit is further configured to close the window and adjusting the angle of view of the navigation frame back to the original angle of view so as to resume the size of the navigation frame when the event is ended.

11. A mobile device, comprising:
a positioning unit, configured to obtain a current location of the mobile device;
a display unit, configured to display a navigation frame;
an input unit, configured to receive an operation of a user;
a processing unit, coupled to the positioning unit, the display unit and the input unit, and is configured to display a navigation frame on the display unit in a form of a three-dimensional picture, to adjust the angle of view of the navigation frame to make the size of the navigation frame reduce and to display a window corresponding to an event in an area of the display unit that is emptied due to the reduction of the navigation frame when receiving the event; and
a sensing unit, coupled to the processing unit, and configured to detect a tilting angle of the mobile device and transmitting the detected tilting angle to the processing unit,
wherein the detected tilting angle is an angle of tilt of the mobile device detected by the sensing unit, and the processing unit triggers the event when the detected tilting angle is being compared to a predetermined range and determined to be within the predetermined range.

* * * * *